Nov. 21, 1961　　　V. E. MANNI　　　3,010,038
DYNAMOELECTRIC MACHINE
Filed Dec. 7, 1959　　　2 Sheets-Sheet 1

WITNESSES

INVENTOR
Vincent E. Manni
BY
ATTORNEY

Nov. 21, 1961   V. E. MANNI   3,010,038
DYNAMOELECTRIC MACHINE
Filed Dec. 7, 1959   2 Sheets-Sheet 2

United States Patent Office 3,010,038
Patented Nov. 21, 1961

3,010,038
DYNAMOELECTRIC MACHINE
Vincent E. Manni, Blawnox, Pa., assignor to Westinghouse Electric Corporation, East Pittsburgh, Pa., a corporation of Pennsylvania
Filed Dec. 7, 1959, Ser. No. 857,848
5 Claims. (Cl. 310—64)

The present invention relates to dynamoelectric machines, and more particularly to the stator or armature coils of large machines, such as turbine generators, of the inner cooled type.

In inner cooled generators, the heat generated in the stator windings is removed by a coolant fluid, usually hydrogen, flowing through ventilating ducts or passages in the coils in substantially direct contact with the winding conductors inside the high voltage ground insulation. In this way, the heat is directly removed from the conductors without having to flow through the heavy ground insulation which is a rather effective thermal barrier. In the actual construction of the windings of these machines, the ventilating ducts are provided by high-resistance metal tubes which are disposed in a stack extending longitudinally of each half coil, with one or more stacks of transposed conductor strands extending on each side of the stack of ventilating ducts. The ducts and strands are lightly insulated from each other and the entire assembly of ducts and strands is enclosed in the heavy, high voltage ground insulation, the ducts being open at the ends for entrance and discharge of hydrogen.

Large turbine generators of this type are relatively high voltage machines with normal operating voltages which are usually in the range from 11,000 volts to as high as 24,000 volts. The high voltage ground insulation of the stator windings of these machines must be capable of withstanding substantial overvoltages, and is subjected to quite high test voltages in the manufacture and routine testing of these machines. In windings of the type described above, it has previously been found that insulation failures or short circuits may occur between the lightly insulated ventilating ducts when the machine is subjected to overvoltage tests. These failures of the ventilating duct insulation were apparently due to a maldistribution of the voltage across the ventilating ducts, causing excessive voltages to appear between certain of the ducts. A partial solution to this problem was provided by electrically connecting the ends of the ducts through high resistance electrical contacts placed between the ends of the ducts, as disclosed and claimed in a patent to M. M. Fromm No. 2,788,456. This has been found to be somewhat effective in reducing the number of insulation failures between ventilating ducts, but such failures have also been found to occur between the ventilating ducts and the conductor strands when high test voltages are applied to a completed winding and in some cases even during operation at normal rated voltage. Insulation failures between the ducts have also sometimes continued to occur.

These failures of the ventilating duct insulation and conductor strand insulation have heretofore been attributed entirely to physical damage to the insulation occurring during manufacture and assembly of the winding. It has now been found, however, that previously unsuspected high voltage stresses occur across the duct and strand insulation during overvoltage testing and in some portions of the winding even during operation of the machine at normal voltage. These voltage stresses may easily be high enough to exceed the dielectric strength of the light duct and strand insulation, which is of the order of not over 1000 volts. These voltage stresses, therefore, are responsible for the insulation failures which have been found to occur between the ventilating ducts and the conductor strands and between the ventilating ducts. Such insulation failures, and resulting short circuits between ducts and strands and between ducts, are of course highly undesirable since they may permit circulating currents to flow with increased heating and losses.

The principal object of the present invention is to provide a simple and inexpensive means for preventing insulation failures between the ventilating ducts and conductor strands, and between the ventilating ducts, of an inner cooled stator winding for large dynamoelectric machines.

A further object of the invention is to provide means for controlling the voltage distribution within an inner cooled stator coil so that high voltage stresses are prevented from occurring across the insulation of the ventilating ducts and conductor strands.

Other objects and advantages of the invention will be apparent from the following detailed description, taken in connection with the accompanying drawing, in which.

Figure 1:
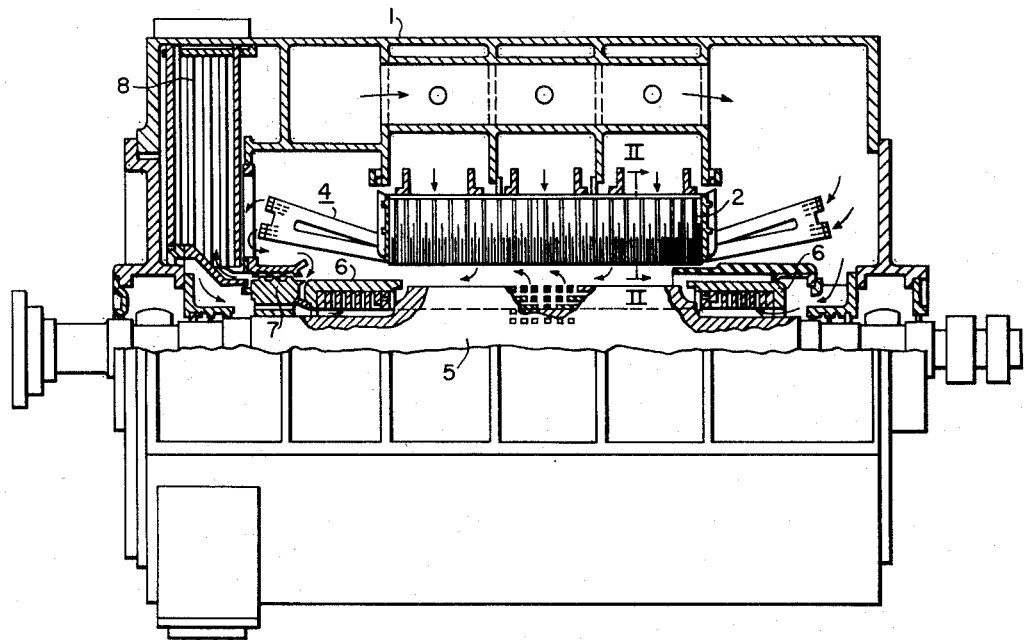
FIGURE 1 is a view partly in elevation and partly in longitudinal section of a large inner cooled turbine generator illustrating the type of machine to which the invention is applicable.

FIGURE 1 shows a typical construction for a large inner cooled generator. As shown in the figure, the generator has an outer substantially gas-tight enclosing housing 1 which is filled with a coolant gas which is normally hydrogen. The machine has a laminated stator core 2 of usual construction supported in the housing 1 in any suitable manner. The stator core 2 is provided with longitudinal slots 3 in the usual manner for the reception of the high voltage stator winding coils 4. The winding is of the inner cooled type and, as more fully described hereinafter, is provided with internal ventilating ducts which are open at the ends of the coils to permit the hydrogen to flow through the ducts. The machine also has a rotor member 5 of any suitable type which is provided with a field winding preferably also of the inner cooled type. As shown, the gas enters the rotor at both ends under the retaining rings 6 and is discharged through radial vents at the center of the rotor. The gas may be circulated through the machine in any suitable manner, the particular ventilating system shown being similar to that more fully described in a patent of R. A. Baudry No. 2,707,242. In this system the gas is circulated by a blower 7 on the rotor shaft which circulates the gas in the manner generally shown by the arrows in FIG. 1 through coolers 8 and then through the stator windings and through the rotor, the gas discharging from the rotor into the air gap and flowing back to the blower. It is to be understood that this particular ventilating system is shown only by way of illustration to illustrate the type of machine to which the invention is applicable, and that any sutiable or desired construction and ventilating system might be used.

Figure 2:
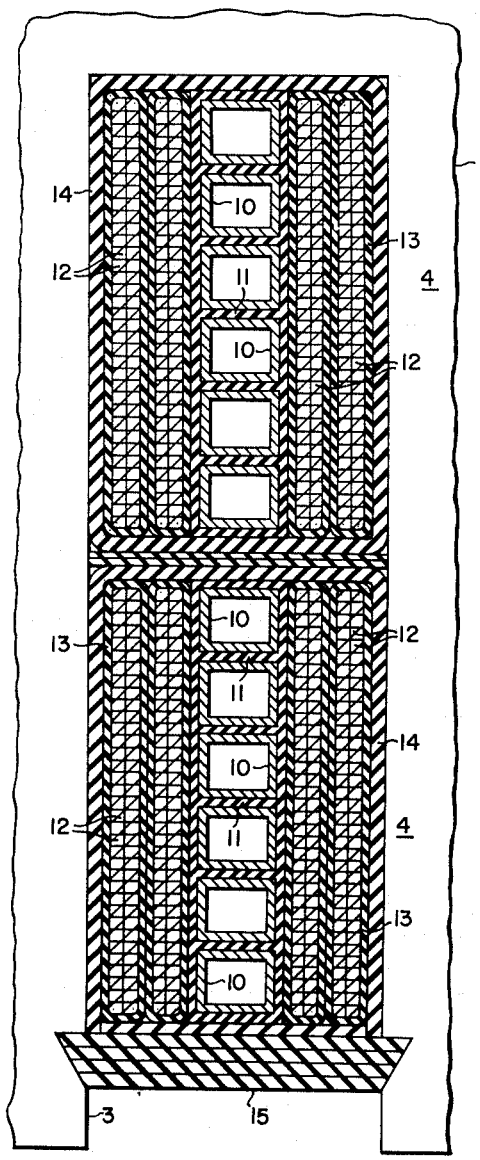
FIG. 2 is a transverse sectional view on an enlarged scale showing the internal construction of the stator coils, the section being taken on a plane such as is indicated at II—II in FIG. 1.

The stator winding of a machine of this type consists of a suitable number of half coils or coil sides, two half coils being placed in each of the slots 3 and the half coils being connected at the ends to form the complete winding. As shown in FIG. 2, each half coil 4 includes a central stack of ventilating ducts 10 which are rectangular tubes of a suitable high resistance metal insulated from each other by relatively light duct insulation indicated at 11, the thickness of the insulation being considerably exaggerated in the drawing for clarity of illustration. Each half coil also includes one or more stacks of conductor strands 12 on each side of the stack of ventilating ducts, the conductor strands also being lightly insulated from each other and being transposed in the usual manner to reduce eddy current losses and prevent circulating currents. The stack of ventilating ducts and the individual stacks of conductor strands may be lightly taped, as indicated at 13, for ease of handling in the assembly of the coil. The complete assembly of stacks of conductor strands and the stack of ventilating ducts is enclosed in the heavy, high voltage ground insulation 14 which is required to withstand the full operating voltage of the machine to ground. As previously indicated, two half coils 4 are placed in each slot 3, as shown in FIG. 2, and the slot is closed by a wedge 15 of any suitable type.

Figure 3:
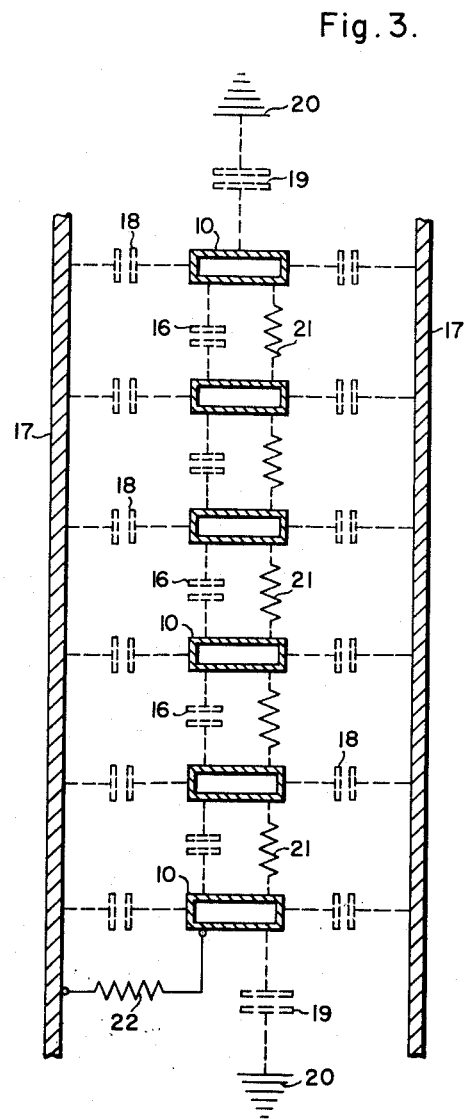
FIG. 3 is a diagram showing the equivalent electrical circuit of the coil of FIG. 2.

The equivalent electrical circuit of such a half coil is shown in FIG. 3. The conducting ventilating ducts 10 are indicated in this figure and are shown as being connected by capacitances 16 representing the light insulation 11 of the ventilating ducts. The conductor strands 12 are represented by a single conductor 17 on each side of the ventilating ducts since the individual conductor strands are all at the same potential and act as a single conductor. The insulation between the conductor strands and the ventilating ducts is represented by capacitances 18. The high voltage ground insulation 14 provides an effective capacitance 19 between the coil assembly and ground 20, which represents the stator core 2 which is normally at ground potential. It will be understood that the diagram of FIG. 3 represents the internal electrical relations of the elements of the half coil and that a relatively large capacitance representing the ground insulation also exists directly between the conductors 17 and ground. High resistance electrical connections represented by resistors 21 are provided between the ventilating ducts 10, as described in the above-mentioned Fromm patent.

As previously described, it has been found that when high test voltages are applied between the conductors of a coil of this type and ground, insulation breakdowns sometimes occur between the conductor strands and ventilating ducts, or between the ventilating ducts themselves, and such breakdowns sometimes occur even during operation at normal voltage. Analysis of the equivalent circuit of FIG. 3 using the capacitance values which are found in actual coils indicates that the voltage distribution across the network shown in FIG. 3 is such that relatively high voltages may occur across the insulation between conductors and ducts, and also between the ducts even when the resistors 21 are present. These voltages have previously been unsuspected and are high enough to cause the insulation failures which have been observed. The use of the resistors 21 has provided a partial solution to this problem by reducing the number of insulation breakdowns between ducts, but they have not provided a satisfactory solution to the entire problem since the troublesome insulation failures have continued to occur, as the resistors 21 do not affect the voltage between ducts and conductors and do not always sufficiently reduce the voltage between ducts. These failures have heretofore been attributed to physical damage to the insulation occurring during manufacture and assembly of the coil, but the discovery of these previously unsuspected voltage stresses due to the internal distribution of voltage within the coil, as determined by the various capacitances previously mentioned, has now been found to account for the excessive voltages which have caused these failures.

Direct current test voltages are also sometimes used and similar insulation failures occur. When direct current test voltages are used, the equivalent circuit is the same as that shown in FIG. 3 except that the capacitances would be replaced by resistances representing the insulation resistance of the various insulating materials involved. The values of these insulation resistances are such that the voltage distribution is essentially the same as when alternating current test voltages are used.

In accordance with the present invention, the voltage distribution within the coil is changed and controlled in such a manner as to reduce the high voltage stresses that have previously occurred across the strand and duct insulation. This is accomplished, as illustrated in FIG. 3, by connecting a relatively high resistance 22 between one of the ventilating ducts 10 and the conductors 17. This resistor in effect short circuits the capacitive reactance, or insulation resistance, between the conductors and the ventilating ducts and thus shifts the voltage drop to the heavy ground insulation where it can safely be withstood. In other words, the presence of the resistance 22 has the effect of bringing the ventilating ducts and the conductors to substantially the same potential, except for the very small voltage across the resistor itself, and thus prevents the occurrence of unduly high voltage stresses across the strand and duct insulation. The resistance 22 is preferably connected between the bottom ventilating duct of the stack and any one or more of the conductor strands.

It is preferred to connect the resistance 22 to the bottom ventilating duct to minimize the circulating current that might occur in case the resistance became short-circuited or its resistance otherwise decreased. If this should occur and a short-circuit should also develop directly between the duct to which the resistance is connected and the conductor strands, a path would be provided for circulating current due to the induced voltage in the duct. This voltage is lowest in the bottom duct because the cross-slot flux density decreases from top to bottom of the slot. The resistance 22 is therefore preferably connected to the bottom duct so that the possible circulating current in case of shorting of the resistance is minimized.

Figure 4:
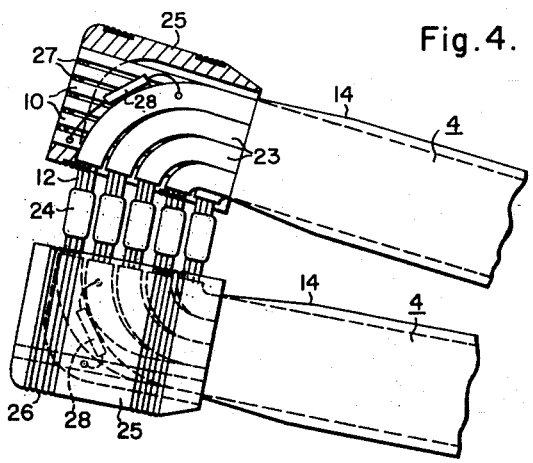
FIG. 4 is a fragmentary end elevation of the end portions of two half coils of the stator winding.

A preferred embodiment of the invention as applied to an actual winding is shown in FIG. 4. In this figure there are shown the end portions of two half coils 4 which are connected together. It will be understood, of course, that one of these coil sides will be in the bottom of one slot 3 of the stator core and the other will be in the top of a different slot. At the end of each half coil the ground insulation 14 terminates and the open ends of the ventilating ducts 10 extend out from the end of the coil for entrance or discharge of hydrogen. The conductor strands 12 are usually brought out in separately insulated groups, as indicated at 23, to permit group transpositions to be made between adjacent coils. The groups of conductor strands are formed in the general shape indicated in the figure and are connected to groups of strands of the adjacent half coil by connectors of any suitable type, indicated at 24. Suitable vent caps 25 may be placed over the coil ends and ventilating ducts and held in place by banding wire 26. The ends of the ventilating ducts 10 are electrically connected by high resistance contact members indicated at 27 in the manner described in the above-mentioned Fromm patent. These contacts may have very high resistance, which may be of the order of 50,000 ohms, or with the present invention the resistance may be even higher and may approach 100,000 ohms if desired.

In accordance with the present invention, a high resistance connection is made between one of the ventilating ducts 10, preferably the bottom duct of the stack, and the conductor strands 12. As shown in FIG. 4, this is done very simply and inexpensively by means of a resistor 28 which is connected at one end to the lowermost ventilating duct 10 and which is connected at the other end to one of the groups of conductor strands, the group insulation being removed in a small area to permit the connection to be made. A resistor 28 is connected at one end only of each half coil of the winding and, as described above in connection with FIG. 3, the effect of this resistor is to reduce the internal voltages within the coil to a sufficiently low value to eliminate any danger of insulation failure between the conductor strands and ventilating ducts or between the ventilating ducts. The value of the resistor 28 is not critical but it has been found that a value of 5000 ohms is very suitable although higher values such as 10,000 ohms may be used if desired with satisfactory results.

It should now be apparent that a simple and inexpensive means has been provided for controlling and limiting the internal voltage stresses across the strand and duct insulation of an inner cooled stator coil for large turbine generators. The troublesome problem of insulation failures within coils of this type has thus been eliminated and the undesirable effects, such as increased losses, resulting from such insulation failures are avoided.

A specific embodiment of the invention has been shown and described for the purpose of illustration, but it will be apparent that the high resistance connection between the ventilating ducts and the conductor strands might be made in other ways, if desired, and the invention is thus capable of various embodiments and modifications. It is to be understood therefore that all equivalent embodiments and modifications are within the scope of the invention.

I claim as my invention:

1. A dynamoelectric machine having a stator member including a slotted stator core and a stator winding, said winding including a plurality of half coils disposed in the slots of the stator core, each half coil comprising a plurality of stacks of lightly insulated conductor strands, a plurality of lightly insulated metal ventilating duct members disposed in at least one stack, and high-voltage insulation enclosing the conductor strands and duct members, and means for providing electrical connections between the duct members and between the duct members and the conductor strands, said connections having very high resistance as compared to the conductor strands and duct members.

2. A dynamoelectric machine having a stator member including a slotted stator core and a stator winding, said winding including a plurality of half coils disposed in the slots of the stator core, each half coil comprising a plurality of stacks of lightly insulated conductor strands, a plurality of lightly insulated metal ventilating duct members disposed in at least one stack, and high-voltage insulation enclosing the conductor strands and duct members, means for making high-resistance electrical connections between the duct members, and means for making a high-resistance electrical connection between the conductor strands and at least one of the duct members, the resistances of said connections being such as to effectively control the distribution of voltage within the half coil.

3. A dynamoelectric machine having a stator member including a slotted stator core and a stator winding, said winding including a plurality of half coils disposed in the slots of the stator core, each half coil comprising a plurality of stacks of lightly insulated conductor strands, a plurality of lightly insulated metal ventilating duct members disposed in at least one stack, and high-voltage insulation enclosing the conductor strands and duct members, means for making high-resistance electrical connections between the duct members, and a resistor connected between the conductor strands and one of the duct members.

4. A dynamoelectric machine having a stator member including a slotted stator core and a stator winding, said winding including a plurality of half coils disposed in the slots of the stator core, each half coil comprising a plurality of stacks of lightly insulated conductor strands, a plurality of lightly insulated metal ventilating duct members disposed in at least one stack, and high-voltage insulation enclosing the conductor strands and duct members, said duct members having open ends and said conductor strands being connected to the conductor strands of another half coil, means for making high-resistance electrical connections between the end portions of the duct members, and means for making a high-resistance electrical connection between the conductor strands and at least one of the duct members, the resistances of said connections being such as to effectively control the distribution of voltage within the half coil.

5. A dynamoelectric machine having a stator member including a slotted stator core and a stator winding, said winding including a plurality of half coils disposed in the slots of the stator core, each half coil comprising a plurality of stacks of lightly insulated conductor strands, a plurality of lightly insulated metal ventilating duct members disposed in at least one stack, and high-voltage insulation enclosing the conductor strands and duct members, said duct members having open ends and said conductor strands being connected to the conductor strands of another half coil, means for making high-resistance electrical connections between the end portions of the duct members, and a resistor connected between the conductor strands and at least one of the duct members.

References Cited in the file of this patent

UNITED STATES PATENTS 2,788,456  Fromm _____ Apr. 9, 1957